(12) United States Patent
Broadway et al.

(10) Patent No.: US 9,796,619 B2
(45) Date of Patent: Oct. 24, 2017

(54) TEMPERABLE THREE LAYER ANTIREFRLECTIVE COATING, COATED ARTICLE INCLUDING TEMPERABLE THREE LAYER ANTIREFRLECTIVE COATING, AND/OR METHOD OF MAKING THE SAME

(75) Inventors: David M. Broadway, Northville, MI (US); Yiwei Lu, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 1718 days.

(21) Appl. No.: 12/923,838

(22) Filed: Oct. 8, 2010

(65) Prior Publication Data

US 2012/0057236 A1    Mar. 8, 2012

Related U.S. Application Data

(63) Continuation-in-part of application No. 12/923,146, filed on Sep. 3, 2010.

(51) Int. Cl.
| | | |
|---|---|---|
| *G02B 1/11* | (2015.01) | |
| *C03C 17/34* | (2006.01) | |
| *G02B 1/115* | (2015.01) | |

(52) U.S. Cl.
CPC .......... *C03C 17/3435* (2013.01); *G02B 1/115* (2013.01); *C03C 2217/73* (2013.01); *C03C 2218/365* (2013.01)

(58) Field of Classification Search
CPC .................. G02B 1/00–1/18; G02B 5/00–5/32
See application file for complete search history.

(56) References Cited

U.S. PATENT DOCUMENTS

| | | |
|---|---|---|
| 3,432,225 A | 3/1969 | Rock |
| 3,736,047 A | 5/1973 | Gelber et al. |
| 3,781,090 A | 12/1973 | Sumita |
| 4,387,960 A | 6/1983 | Tani |
| 5,728,456 A | 3/1998 | Adair et al. |

(Continued)

FOREIGN PATENT DOCUMENTS

| | | |
|---|---|---|
| DE | 10329917 | 2/2005 |
| EP | 0 933 654 | 8/1999 |

(Continued)

OTHER PUBLICATIONS

International Search Report dated May 4, 2012.

(Continued)

*Primary Examiner* — Bumsuk Won
*Assistant Examiner* — Jeffrey Madonna
(74) *Attorney, Agent, or Firm* — Nixon & Vanderhye P.C.

(57) ABSTRACT

A coated article includes a temperable antireflection (AR) coating that utilizes medium and low index (index of refraction "n") layers having compressive residual stress in the AR coating. In certain example embodiments, the coating may include the following layers from the glass substrate outwardly: silicon oxynitride ($SiO_xN_y$) medium index layer/high index layer/low index layer. In certain example embodiments, depending on the chemical and optical properties of the high index layer and the substrate, the medium and low index layers of the AR coating are selected to cause a net compressive residual stress.

6 Claims, 12 Drawing Sheets

(56) References Cited

U.S. PATENT DOCUMENTS

| | | | |
|---|---|---|---|
| 5,891,556 A | 4/1999 | Anderson et al. | |
| 6,068,914 A | 5/2000 | Boire et al. | |
| 6,074,730 A * | 6/2000 | Laird et al. | 359/586 |
| 6,238,781 B1 * | 5/2001 | Anderson et al. | 359/586 |
| 6,586,102 B1 | 7/2003 | Stachowiak | |
| 6,589,657 B2 | 7/2003 | Dannenberg | |
| 6,692,832 B2 | 2/2004 | Murphy | |
| 6,924,037 B1 | 8/2005 | Joret et al. | |
| 6,972,136 B2 | 12/2005 | Koenig et al. | |
| 7,311,938 B2 | 12/2007 | Koenig et al. | |
| 7,588,823 B2 | 9/2009 | Taylor | |
| 2001/0002295 A1 | 5/2001 | Anderson et al. | |
| 2001/0031365 A1 | 10/2001 | Anderson et al. | |
| 2003/0224181 A1 | 12/2003 | Finley et al. | |
| 2005/0030629 A1 | 2/2005 | Kursawe et al. | |
| 2006/0087739 A1 | 4/2006 | Ockenfuss et al. | |
| 2006/0169316 A1 | 8/2006 | Thomsen et al. | |
| 2006/0210783 A1 | 9/2006 | Seder et al. | |
| 2006/0249199 A1 | 11/2006 | Thomsen et al. | |
| 2007/0030569 A1 | 2/2007 | Lu et al. | |
| 2007/0074757 A1 | 4/2007 | Mellott et al. | |
| 2007/0116966 A1 | 5/2007 | Mellott et al. | |
| 2007/0215205 A1 | 9/2007 | Thomsen et al. | |
| 2008/0185041 A1 | 8/2008 | Sharma et al. | |
| 2009/0010203 A1 | 1/2009 | Pratt, Jr. et al. | |
| 2009/0025776 A1 | 1/2009 | Varaprasad | |
| 2009/0025777 A1 | 1/2009 | Varaprasad | |
| 2009/0032098 A1 | 2/2009 | Lu | |
| 2009/0075092 A1 | 3/2009 | Varaprasad | |
| 2009/0101209 A1 | 4/2009 | Sharma et al. | |
| 2009/0133748 A1 | 5/2009 | Sharma | |
| 2009/0148709 A1 | 6/2009 | Disteldorf et al. | |
| 2009/0176107 A1 | 7/2009 | Sharma | |
| 2009/0217978 A1 | 9/2009 | Thomsen et al. | |
| 2009/0223252 A1 | 9/2009 | Fulton et al. | |
| 2010/0122728 A1 | 5/2010 | Fulton et al. | |
| 2011/0081532 A1 | 4/2011 | Lu | |
| 2011/0157703 A1 | 6/2011 | Broadway et al. | |

FOREIGN PATENT DOCUMENTS

| | | |
|---|---|---|
| FR | 2 793 889 | 11/2000 |
| JP | 58-070201 | 4/1983 |
| JP | 8-337441 | 12/1996 |
| JP | 11-509513 | 8/1999 |
| JP | 2000-509511 | 7/2000 |
| JP | 2003-500249 | 1/2003 |
| JP | 2005-055899 | 3/2005 |
| WO | WO 97/27997 | 8/1997 |
| WO | WO 01/48261 | 7/2001 |
| WO | WO 2012/030372 | 3/2012 |
| WO | WO 2012/102851 | 8/2012 |

OTHER PUBLICATIONS

U.S. Appl. No. 12/923,146 Broadway et al., filed Sep. 3, 2010.
U.S. Appl. No. 12/591,225, Sharma et al., filed Nov. 12, 2009.
U.S. Appl. No. 12/385,318, Fulton et al., filed Apr. 3, 2009.
Taiwan Office Action and Search Report for TW 100136046.
Japanese Office Action for JP 2013-532787.

* cited by examiner

|  | Transmittance % | | | | Reflective Glass Side % | | | | Reflective Film Side % | | | |
|---|---|---|---|---|---|---|---|---|---|---|---|---|
|  | T% | L* | a* | b* | Y% | L* | a* | b* | Y% | L* | a* | b* |
| Sample ID # | | | | | | | | | | | | |
| P-BA-OP-P-AC | 93.6 | 97.5 | -1.1 | 0.9 | 4.8 | 26.2 | 1.4 | -3.4 | 4.7 | 25.8 | 1.0 | -3.5 |
| P-BA-OP-C-AC | 93.5 | 97.4 | -1.1 | 0.8 | 4.8 | 26.2 | 1.5 | -2.9 | 4.7 | 25.8 | 1.2 | -3.0 |
| P-BA-OP-V-AC | 93.6 | 97.5 | -1.1 | 0.9 | 4.8 | 26.2 | 1.7 | -3.3 | 4.7 | 25.8 | 1.3 | -3.3 |
| Average | 93.6 | 97.5 | -1.1 | 0.9 | 4.8 | 26.2 | 1.6 | -3.2 | 4.7 | 25.8 | 1.2 | -3.3 |

Fig. 6

|  | Transmittance % | | | | Reflective Glass Side % | | | | Reflective Film Side % | | | |
|---|---|---|---|---|---|---|---|---|---|---|---|---|
|  | T% | L* | a* | b* | Y% | L* | a* | b* | Y% | L* | a* | b* |
| Sample ID # | | | | | | | | | | | | |
| P-BA-OP-P-HT | 94.1 | 97.7 | -1.2 | 0.7 | 4.6 | 25.5 | 2.7 | -3.2 | 4.5 | 25.2 | 2.4 | -3.3 |
| P-BA-OP-C-HT | 94.0 | 97.6 | -1.2 | 0.5 | 4.6 | 25.4 | 2.5 | -1.9 | 4.7 | 25.9 | 2.7 | -1.9 |
| P-BA-OP-V-HT | 93.7 | 97.5 | -1.3 | 0.6 | 4.6 | 25.7 | 3.1 | -2.5 | 4.5 | 25.4 | 2.8 | -2.6 |
| Average | 93.9 | 97.6 | -1.2 | 0.6 | 4.6 | 25.5 | 2.8 | -2.5 | 4.6 | 25.5 | 2.6 | -2.6 |

Fig. 7

| Example | SiOxNy (nm) | TiOx (nm) | SiOx (nm) | As-Deposited Residual Stress σx, MPa | σy, MPa | Heat-treated at 650°C for 10 min σx, MPa | σy, MPa |
|---|---|---|---|---|---|---|---|
| (a) 3-layer stack with thin TiOx | 72 | 19 | 95 | -296.0 | -263.5 | -170.5 | -155.2 |
| (b) Comparative 3-layer stack with conventional TiOx thickness | 75 | 100 | 78 | -146.6 | -138.8 | 169.6 | 170.0 |
| (c) Comparative 3-layer stack with conventional TiOx thickness; TiOx deposited with lower power | 72 | 102 | 92 | -197.7 | -181.4 | 91.2 | 111.3 |
| (i) Stress in single SiOxNy layer | 71.4 | n/a | n/a | -442 | -413.7 | -232.2 | -221.9 |
| (ii) Stress in single SiOx layer | n/a | n/a | 86.4 | -170 | -173.4 | -232.2 | -116.9 |

Fig. 8

| Layer Stack | Physical Thickness Range, nm | Index range at 380nm wavelength | Index range at 550nm wavelength | Index range at 780nm wavelength |
|---|---|---|---|---|
| | | Glass | | |
| SiOxNy | 94-115 | 1.8-2.0 | 1.7-1.8 | 1.65-1.8 |
| TiOx | 12-22 | 2.7-2.9 | 2.3-2.5 | 2.2-2.4 |
| SiOx | 89-109 | 1.48-1.52 | 1.48-1.52 | 1.46-1.5 |
| | | Air | | |

TEMPERABLE THREE LAYER ANTIREFRLECTIVE COATING, COATED ARTICLE INCLUDING TEMPERABLE THREE LAYER ANTIREFRLECTIVE COATING, AND/OR METHOD OF MAKING THE SAME

CROSS-REFERENCE TO RELATED APPLICATION

This application is a continuation-in-part (CIP) of U.S. application Ser. No. 12/923,146 filed Sep. 3, 2010, the entire contents of which are hereby incorporated herein by reference.

FIELD OF THE INVENTION

Certain example embodiments of this invention relate to a coated article including a temperable antireflective coating, and/or a method of making the same. In certain example embodiments, a temperable antireflective (AR) coating utilizes $SiO_xN_y$ as the medium index layer of the coating. In certain example embodiments, the coating may include the following layers from the glass substrate outwardly: silicon oxynitride (e.g., $SiO_xN_y$) as the medium index layer/titanium oxide (e.g., TiOx) as the high index layer/silicon oxide (e.g., SiOx) as the low index layer. In certain example embodiments, the thicknesses and/or types of stress in each layer may be optimized in order to produce a temperable, three layer antireflective coating.

BACKGROUND AND SUMMARY OF EXAMPLE EMBODIMENTS OF THE INVENTION

Antireflective (AR) coatings are known in the art. For example, AR coatings in the visible range are widely used on glass in electronics, lighting, appliances, architectural, and display applications. There are various techniques for reducing the reflection of visible light moving from air onto and through a glass surface. One technique is to apply a thin layer of material onto the surface of a glass substrate, interposing the thin layer between the glass substrate and the air. Optimally, the index of refraction of the thin layer is equal to the square root of the product of the index of refraction of visible light through air and the index of refraction of visible light through the glass substrate. Achieving this optimal index of refraction is difficult however.

Further, in many of these applications, tempered or heat-strengthened glass may be required. Tempering or heat strengthening of the glass is sometimes done prior to the deposition of the AR coating to avoid unwanted changes in the optical, mechanical, or aesthetic quality of the coating as a consequence of exposing the coating to the high temperatures required for tempering and other forms of heat treatment. However, this "temper then coat" method may be undesirable in certain circumstances.

Further, a coat then temper technique may create additional problems. When glass is coated and then tempered, the result of the tempering process may produce undesirable optical flaws in the overall glass product. For example, the color shift, or $\Delta E$, in the tempered, coated glass product may render the glass unusable. Further, techniques that maintain the optical characteristics of a substrate with an AR between pre and post tempering are desirable (e.g., one AR coating may be applied in more than one situation).

Thus, it will be appreciated that there exists a need in the art for improved antireflective (AR) coatings (e.g., temperable AR coatings) for coated articles such as windows and the like.

In certain example embodiments, there is provided a coated article comprising an antireflective coating supported by a major surface of a substrate, the substrate being heat treated together with the antireflective coating, wherein the antireflective coating comprises, in order moving away from the substrate: a medium index layer comprising silicon oxynitride and having a index of refraction of from about 1.65 to 2.0 at 380 nm, 550 nm, and 780 nm wavelengths, a high index layer having an index of refraction of at least about 2.0 at 380 nm, 550 nm, and 780 nm wavelengths, and a low index layer having an index of refraction of from about 1.4 to 1.6 at 380 nm, 550 nm, and 780 nm wavelengths, wherein the medium index layer has compressive residual stress after heat treatment.

In certain example embodiments, there is provided a heat treatable coated article, the coated article comprising: an antireflective coating supported by a major surface of a substrate, wherein the antireflective coating comprises, in order moving away from the substrate: a medium index layer comprising silicon oxynitride and having a index of refraction of from about 1.65 to 2.0 at 380 nm, 550 nm, and 780 nm wavelengths, a high index layer having an index of refraction higher than that of the medium index layer at 380 nm, 550 nm, and 780 nm wavelengths, and a low index layer having an index of refraction lower than that of the medium index layer at 380 nm, 550 nm, and 780 nm wavelengths, wherein the medium index layer and the low index layer have compressive residual stress after any heat treatment, the high index layer has tensile residual stress after any heat treatment, and the antireflective coating has a net compressive residual stress.

In certain example embodiments, there is provided a heat treatable coated article, the coated article comprising an antireflective coating supported by a major surface of a substrate, wherein the antireflective coating comprises, in order moving away from the substrate: a medium index silicon-inclusive layer having a index of refraction of 1.8 or less 550 nm and 780 nm wavelengths and 2.0 or less at 380 nm, a high index layer having an index of refraction higher than that of the medium index layer at 380 nm, 550 nm, and 780 nm wavelengths, wherein the high index layer has a thickness no greater than about 20 nm, and a low index layer having an index of refraction lower than that of the medium index layer at 380 nm, 550 nm, and 780 nm wavelengths, wherein the medium index layer and the low index layer have compressive residual stress, the high index layer has tensile residual stress, and the antireflective coating has a net compressive residual stress.

In certain example embodiments, there is provided a method of making a coated article with a three-layered antireflection coating, the method comprising: disposing a medium index layer, directly or indirectly, on a glass substrate; disposing a high index layer over and contacting the medium index layer; disposing a low index layer over and contacting the high index layer; and heat-treating the glass substrate with the antireflective coating thereon, and wherein the coated article has a net compressive residual stress.

In certain example embodiments, a method of making a coated article is provided. A glass substrate is provided. A silicon-inclusive medium index layer is disposed, directly or indirectly, on a first major surface of the substrate. A high index layer is disposed over and contacting the medium index layer, the high index layer having a thickness of at least 85 nm. A low index layer is disposed over and contacting the high index layer. The substrate is heat treated with the medium, high, and low index layers disposed thereon. The coated article has a ΔE* value of less than 3 between as deposited and heat treated states.

In certain example embodiments, a method of making a coated article is provided. A glass substrate is provided. A silicon-inclusive medium index layer is disposed, directly or indirectly, on a first major surface of the substrate. A high index layer is disposed over and contacting the medium index layer, the high index layer having a thickness of at least 85 nm. A low index layer is disposed over and contacting the high index layer. The coated article is heat treatable so as to have a ΔE* value of less than 3.

In certain example embodiments, a coated article comprising an antireflective coating supported by a first major surface of a substrate is provided. The antireflective coating comprises, in order moving away from the substrate: a silicon-inclusive medium index layer disposed, directly or indirectly, on the first major surface of the substrate; a high index layer disposed over and contacting the medium index layer, the high index layer having a thickness of at least 85 nm; and a low index layer disposed over and contacting the high index layer. The coated article is heat treatable so as to have a ΔE* value of less than 3.

According to certain example embodiments, A second major surface of the substrate may support a second antireflective coating that comprises, in order moving away from the substrate: a second silicon-inclusive medium index layer, directly or indirectly, on the second major surface of the substrate; a second high index layer over and contacting the second medium index layer, the high index layer having a thickness of at least 85 nm; and a second low index layer over and contacting the second high index layer. All said layers may be disposed on the substrate prior to any heat treating. In such example embodiments, the ΔE* value may be less than 2 and sometimes less than or equal to about 1.5.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 6 is a table showing the as-coated visible transmission and color characteristics of an AR coating made according to certain example embodiments of this invention;

FIG. 7 is a table showing the resulting optical qualities of an AR coating made according to certain example embodiments of this invention after exposure to 650 degrees C. for 10 minutes;

FIG. 8 is a table showing examples of the compressive and tensile stresses than can arise in different layers, both as-deposited and after heat-treatment and/or tempering;

DETAILED DESCRIPTION OF EXAMPLE EMBODIMENTS OF THE INVENTION

Figure 1:
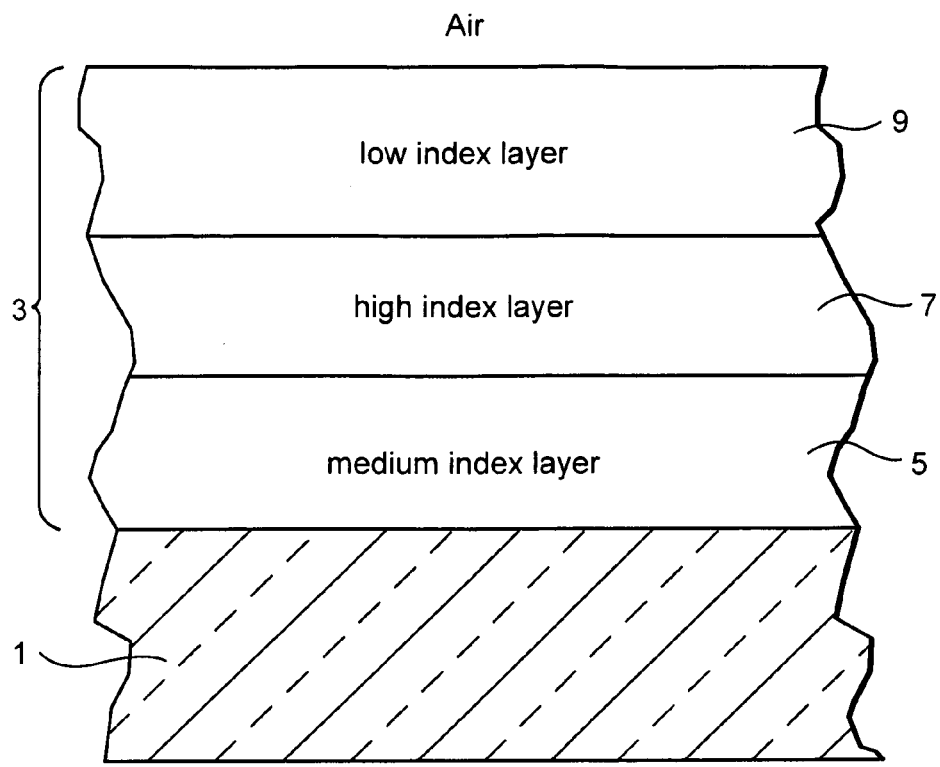
FIG. 1 is an example of a three-layered temperable AR coating generally according to certain example embodiments of this invention.

Referring now more particularly to the accompanying drawings in which like reference numerals indicate like parts throughout the several views.

Certain example embodiments of this invention relate to a coated article including an antireflective coating, and/or a method of making the same. In certain example embodiments, a temperable antireflective (AR) coating is provided.

As indicated above, AR coatings in the visible range are widely used on glass in electronics, lighting, appliances, architectural, and display applications. Although tempering or heat strengthening of the glass is sometimes done prior to the deposition of the AR coating to avoid unwanted changes in the optical, mechanical, or aesthetic quality of the coating as a consequence of exposing the coating to the high temperatures required for tempering and other forms of heat treatment, there are drawbacks associated with the "temper then coat" method under certain example circumstances. For example, tempering prior to coating may be undesirable for large area coaters. The final size of the tempered/heat treated substrate to be coated may be of a dimension that does not efficiently employ the large area coating capability, which is useful when attempting to increase achieve the high efficiencies possible by virtue of high volume glass coating manufacturing techniques.

When the AR coating is applied prior to tempering other problems in the manufacturing process may develop. For example, for a three layer visible anti-reflective coating, it sometimes is desirable to have a refractive index on the layer immediately adjacent to the glass substrate of between about 1.65 and 2.0. However, while there are certain materials that do possess such properties, using these materials in a three-layer coating may or may not result in undesirable color shifts and degradation in the spectral response of the coating after exposure to typical tempering environments. Thus, certain materials utilized in AR coatings may show a change in spectral response after tempering and thus may cause an undesired color shift relative to the "as deposited" form of the coating.

Therefore, it will be appreciated that a three-layered antireflective coating that can be tempered and/or heat treated while preserving its aesthetic quality and high chemical and mechanical durability after exposure to temperatures typically encountered in tempering and/or heat treating environments would be advantageous.

Existing three layer AR coatings may not be sufficiently temperable in certain example embodiments, e.g., in the sense that such coatings may not survive the tempering process in a usable or desirable form. As one example, it is noted that some materials utilized in AR coatings may have high tensile residual stress after exposure to temperatures greater than, for example, 300 degrees C. When the tensile residual stress of one layer is so high such that it results in a net tensile stress in the multilayer stack, this stress may be sufficient to cause an aesthetic degradation of the coating. This and/or similar problems may, for example, result in the cracking of the coating. Therefore, it may be advantageous to reduce the tensile residual stress in a layer in an AR coating, offset the tensile residual stress by reducing the thickness of that layer, balance the tensile residual stress in one layer with compressive residual stress in the other layer(s), etc.

Compressive stress, when applied, acts toward the center of a material. Thus, when a material is subjected to compressive stress, the material is under compression. When a material is subjected to tensile stress, on the other hand, the material may suffer stretching or elongation. Accordingly, if too much tensile residual stress is present in a layer in a coating, the layer and/or coating may suffer deformation or cracking in certain instances. Therefore, in certain example embodiments, it may be more desirable for a coating to have a net compressive residual stress rather than a net tensile residual stress.

FIG. 1 is a cross sectional view of an example coated article according to an example embodiment of this invention. The coated article of the FIG. 1 embodiment includes substrate 1 that supports temperable antireflective (AR) coating 3. Substrate 1 is typically a glass substrate (e.g., clear, green, bronze, or blue-green glass substrate from about 1.0 to 10.0 mm thick), but may be other materials in certain example instances such as polycarbonate or acrylic. The AR coating 3 includes medium index layer 5, high index layer 7, and low index layer 9. The medium, high, and low index layers 5, 7, and 9 may be provided in this order moving away from the substrate 1 in certain example embodiments of this invention. Furthermore, in certain example embodiments, the layers may directly contact one another. In this example embodiment, the low index layer 9 is the outermost layer of the coating 3, whereas the medium index layer 5 is the bottom-most layer of the AR coating 3. The AR coating 3 is a dielectric type coating in that each of layers 5, 7 and 9 is a dielectric layer (i.e., not electrically conductive). Thus, the AR coating 3 of the FIG. 1 example embodiment has no IR reflecting layer (i.e., no metallic layer of Ag, Au, or the like), and no transparent conductive oxide (TCO) layer such as a pyrolytically deposited metal oxide/nitride. Of course, it will be appreciated that low-E coatings may be used in connection with different embodiments of this invention, e.g., in combination with the AR coating 3 on the same or opposite side of the substrate 1.

In certain example embodiments of this invention, a temperable AR coating includes at least three dielectric layers, namely a high index layer, a medium index layer and a low index layer. The meanings of "high", "medium" and "low" are simply that the medium index layer has an index of refraction (n) less than that of the high index layer and greater than that of the low index layer (e.g., no specific values are required merely by the use of "high", "medium" and "low"). The high, medium, and low index layers are typically dielectric layers in certain example embodiments of this invention, in that they are not electrically conductive.

The refractive index (n) of medium index layer 5 is less than the refractive index of the high index layer 7 and greater than the refractive index of the low index layer 9. In certain example embodiments, the low index layer 9 may be of or include silicon or an oxide thereof (e.g., $SiO_2$ or other suitable stoichiometry), MgF, or their alloyed oxide and fluoride. In certain example embodiments, the high index layer 7 may be of or include a metal oxide, metal nitride and/or metal oxynitride such as titanium oxide (e.g., $TiO_2$ or other suitable stoichiometry), zinc oxide, silicon or a nitride thereof, or the like.

Figure 2:
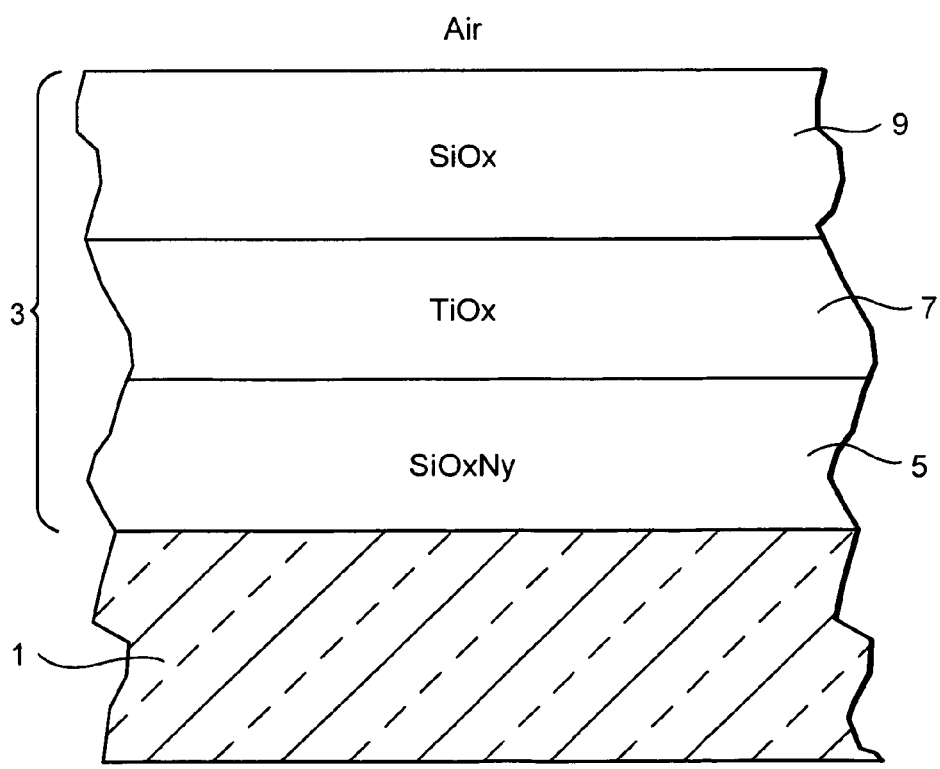
FIG. 2 is an example of an optimal three-layered temperable AR coating made according to certain example embodiments of this invention.

The AR coating of FIG. 2 is the same as the AR coating of FIG. 1, but instead shows example materials used for each of the medium, high, and low index layers.

In certain example embodiments of this invention, the medium index layer 5 is a bottom layer of the AR coating and has an index of refraction (n) of from about 1.60 to 2.0, more preferably from about 1.65 to 1.9, even more preferably from about 1.7 to 1.8, and most preferably from about 1.7 to 1.79 (at 550 nm). At 380 nm, in certain example embodiments, an ideal refractive index of medium index layer 5 is from about 1.8 to 2.0. In further example embodiments, the index of refraction of medium index layer 5 is from about 1.65-1.8 at 780 nm.

In certain instances, it is advantageous that the material(s) comprising medium index layer 5 have desired optical and mechanical properties in the as-deposited state as well as after exposure to temperatures typical in tempering and/or heat treating environments. It will be appreciated that materials such as aluminum oxynitride, though having desired properties in the as-deposited state, may degrade in optical and/or mechanical properties after exposure to temperatures typical in tempering and/or heat treating environments. Aluminum oxynitride may, however, be used in different embodiments of this invention if it can be made to be sufficiently survivable.

Furthermore, it is advantageous if the medium index layer 5 has a compressive residual stress in both the as-coated and heat-treated states. In certain example embodiments, this compressive residual stress may help to offset the tensile residual stress in the other layer(s) in the stack. In certain instances, this may promote a net compressive stress in the three layer AR stack, which discourages cracking of the coating during the tempering and/or heat treating processes.

Medium index layer 5 preferably has a thickness of from about 75 to 135 nm, more preferably from about 80 to 130 nm, even more preferably from about 89 to 120 nm, and most preferably from about 94 to 115 nm.

It has surprisingly been found that silicon oxynitride (e.g., SiOxNy) can be deposited to have an index of refraction of from about 1.60 to 2.0, more preferably from about 1.65 to 1.9, even more preferably from about 1.7 to 1.85 or 1.7 to 1.8, and most preferably from about 1.7 to 1.79 (at 550 nm), and will not significantly degrade in its mechanical or optical properties upon tempering and/or heat treatment. Moreover, in certain example embodiments, a layer of or comprising silicon oxynitride (e.g., SiOxNy) advantageously has a compressive residual stress in both the as-coated and heat-treated states. Therefore, it has advantageously been found that a layer of or including silicon oxynitride (e.g., SiOxNy) is suitable for use as a medium index layer 5 in a temperable three layer AR coating.

In certain example embodiments of this invention, the high index layer 7 is provided over the medium index layer 5 of the AR coating 3. Layer 7 has an index of refraction of at least about 2.0, preferably from about 2.1 to 2.7, more preferably from about 2.25 to 2.55, and most preferably from about 2.3 to 2.5 (at 550 nm) in certain example embodiments. In certain example embodiments, an ideal index of refraction of high index layer 7 at 380 nm may be from about 2.7 to 2.9 (and all subranges therebetween). In further example embodiments, an ideal index of refraction of high index layer 7 at 780 nm may be from about 2.2 to 2.4 (and all subranges therebetween).

High index layer 7 preferably has a thickness of from about 5 to 50 nm, more preferably from about 10 to 35 nm, even more preferably from about 12 to 22 nm, and most preferably from about 15 to 22 nm. In certain exemplary embodiments, the high index layer 7 has a thickness of less than about 25 nm.

In certain instances, it is advantageous that the material(s) comprising high index layer 7 have a high index of refraction. An example material for use as a high index layer is titanium oxide (e.g., TiOx). However, in certain example embodiments, titanium oxide has a high tensile residual stress after exposure to temperatures above 300 degrees C. The high tensile stress in this layer is associated with a phase change from amorphous to crystalline, observed between the as-coated and as-heat treated states. This phase change, in certain instances, occurs at a temperature below the maximum temperature of exposure of the coating during a typical tempering and/or heat treating process. The greater the thickness of the titanium oxide-based layer, the greater the tensile residual stress. Depending on the thickness of the titanium oxide-based layer (e.g., TiOx), the high tensile residual stress in the titanium oxide-based layer can case an overall large net tensile stress in the three layer stack.

Therefore, it will be advantageous in certain instances if a temperable AR coating including a high index layer of or including titanium oxide (e.g., TiOx) comprises other layers (e.g., medium index layer and/or low index layer) having and/or promoting net compressive residual stress after tempering and/or heat treating, in order to offset the high tensile stress of titanium oxide based layer after exposure to high temperatures. In other instances, it is further advantageous if the physical thickness of the high index titanium oxide-based layer 7 (e.g., TiOx) can be reduced, while still maintaining the appropriate range of optical thicknesses to achieved desired optical properties of the temperable AR coating. In certain example embodiments, this will advantageously reduce the net tensile stress of the layer, and may promote a net compressive residual stress for the overall coating. In other words, in certain example embodiments, when the physical thickness of the titanium oxide-based layer is limited, and the other layers are of materials having compressive residual stresses after tempering and/or heat treatment, it has surprisingly been found that a chemically and mechanically durable tempered coated article with good antireflective properties can be achieved.

In certain example embodiments of this invention, the low index layer 9 is provided over the high index layer 7 of the AR coating 3. Layer 9 has an index of refraction of from about 1.4 to 1.6, more preferably from about 1.45 to 1.55, and most preferably from about 1.48 to 1.52 (at 550 nm) in certain example embodiments. In certain example embodiments, an ideal index of refraction of low index layer 9 at 380 nm may be from about 1.48 to 1.52 (and all subranges therebetween). In further example embodiments, an ideal index of refraction of low index layer 9 at 780 nm may be from about 1.46 to 1.5 (and all subranges therebetween).

In certain example embodiments, low index layer 9 has a thickness of from about 70 to 130 nm, more preferably from about 80 to 120 nm, even more preferably from about 89 to 109 nm, and most preferably from about 100 to 110 nm.

In certain instances, it is advantageous that the material(s) comprising low index layer 9 have an index of refraction lower than both the medium and high index layers, and in certain example embodiments, the refractive index of low index layer 9 may be less than that of the glass substrate upon which the coating is provided. An example material for use as a low index layer is silicon oxide (e.g., SiOx).

The use of silicon oxide (e.g., SiOx) as the low index layer in a temperable three layer AR coating in certain example embodiments is advantageous because silicon oxide has a low refractive index, and high chemical and mechanical durability. Additionally, in certain example embodiments, a low index layer based on silicon oxide advantageously has a compressive residual stress in both the as-coated and heat-treated/tempered states. In certain example embodiments, the compressive residual stress in a low index layer based on silicon oxide may help to offset the tensile residual stress in the titanium oxide-based layer. Utilizing a low index layer with compressive residual stress in conjunction with a high index layer with high tensile residual stress helps to promote a net compressive stress in a temperable three layer AR stack in certain example embodiments. This is advantageous in that it may help discourage cracking of the AR coating 3 during tempering and/or heat treating the coated article in certain example embodiments.

Figure 3:
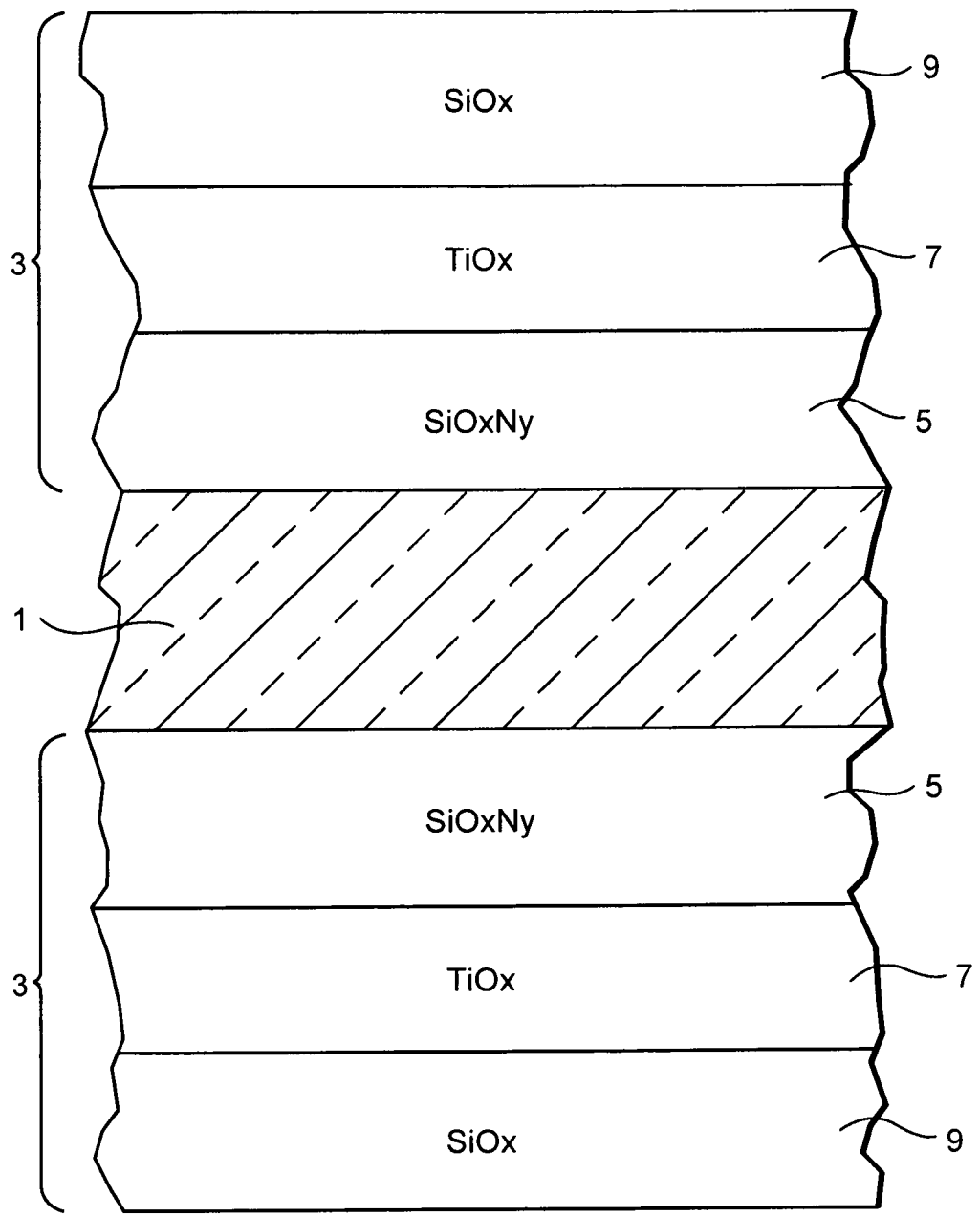
FIG. 3 is an example of a two-sided temperable AR coating made according to certain example embodiments of this invention.

The AR coating 3 of FIGS. 1 and 2 may be provided on only one major surface of glass substrate 1 as shown in FIGS. 1 and 2. However, FIG. 3 illustrates an example embodiment of this invention where the coating 3 is provided on both the major surfaces of the glass substrate 1. In other words, a first AR coating 3 is provided on a first major surface of the substrate 1 and a second AR coating 3 is provided on a second major surface of the substrate 1.

In certain example embodiments, the temperable AR coating may be designed to reduce undesired reflection. In most cases, reduced reflection comes with increased transmission such as AR on picture frame glass that a higher than 98% transmission is desired. However, the increased transmission may not always be desired. For example, the AR coating in the area overlapped with black matrix in a display would benefit from a reflectivity that is as low as possible, but transmission (T) is relatively unimportant. In other words, as will be appreciated by those skilled in the art, the transmission depends at least in part on the substrates and/or applications.

Coated articles with antireflection coatings 3 are useful in certain window applications as mentioned herein. In this respect, coated articles according to certain example embodiments of this invention may have a visible transmission of at least about 50%, more preferably of at least about 60%, and most preferably of at least about 70%. Such windows may be monolithic window glazings, insulating glass (IG) units, vacuum insulating glass (VIG) units, and/or the like. In IG and/or VIG example applications, the one or more substrates may support the antireflective coating 3 as shown and described herein.

EXAMPLES

Example 1

An Example AR coating 3 was made as follows: $SiO_xN_y$ layer 5 (medium index layer) about 95 nm thick, $TiO_2$ layer 7 (example high index layer) about 21 nm thick, and $SiO_2$ layer 9 (example low index layer) about 105 nm thick. The clear glass substrate was about 5 mm thick, and was soda lime silica type glass. Each of layers 5, 7, and 9 was deposited on the glass substrate 1 by sputtering a target(s). The coating 3 was provided on only one major surface of the glass substrate in certain instances as shown in FIG. 1, but may be provided on both major surfaces of the glass substrate in other instances as shown in FIG. 3. The coating was tempered at 650 degrees C. for 10 minutes.

Figure 4:
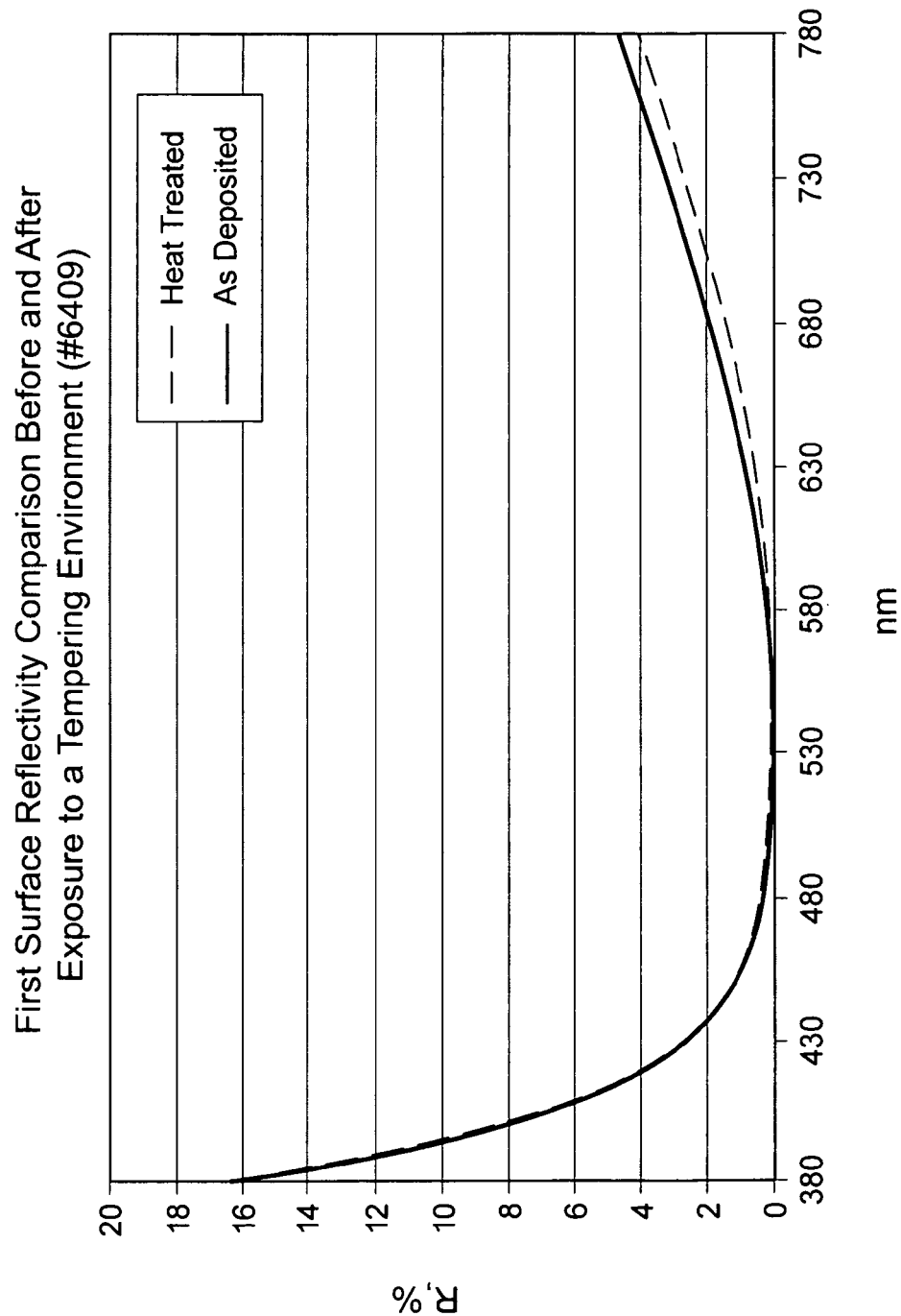
FIG. 4 is a graph of the first surface reflectivity comparison of an AR coating before and after exposure to a tempering environment.

FIG. 4 is a graph showing a comparison of the first surface reflectivity of an as-coated and a tempered/heat-treated three layer visible AR coating at an 8 degree incident angle using White Light. FIG. 4 illustrates the reflection spectra of an example having SiOxNy adjusted to achieve a refractive index for the medium index layer 5 of from about 1.7-1.8 (at 550 nm), on one major surface of the glass substrate. It can be seen that excellent AR characteristics (e.g., low R %) are achieved in a wavelength range of from about 450 to 650 nm, and even more so from about 500 to 600 nm. The design minimizes or reduces photopic reflection (CIE-C, 2°), and the measured value was less than 0.4%. In certain example embodiments of this invention, the coated article has a photopic reflection of less than about 3.0%, more preferably less than about 1.0%, more preferably less than about 0.5%, and most preferably less than about 0.25%.

Figure 5:
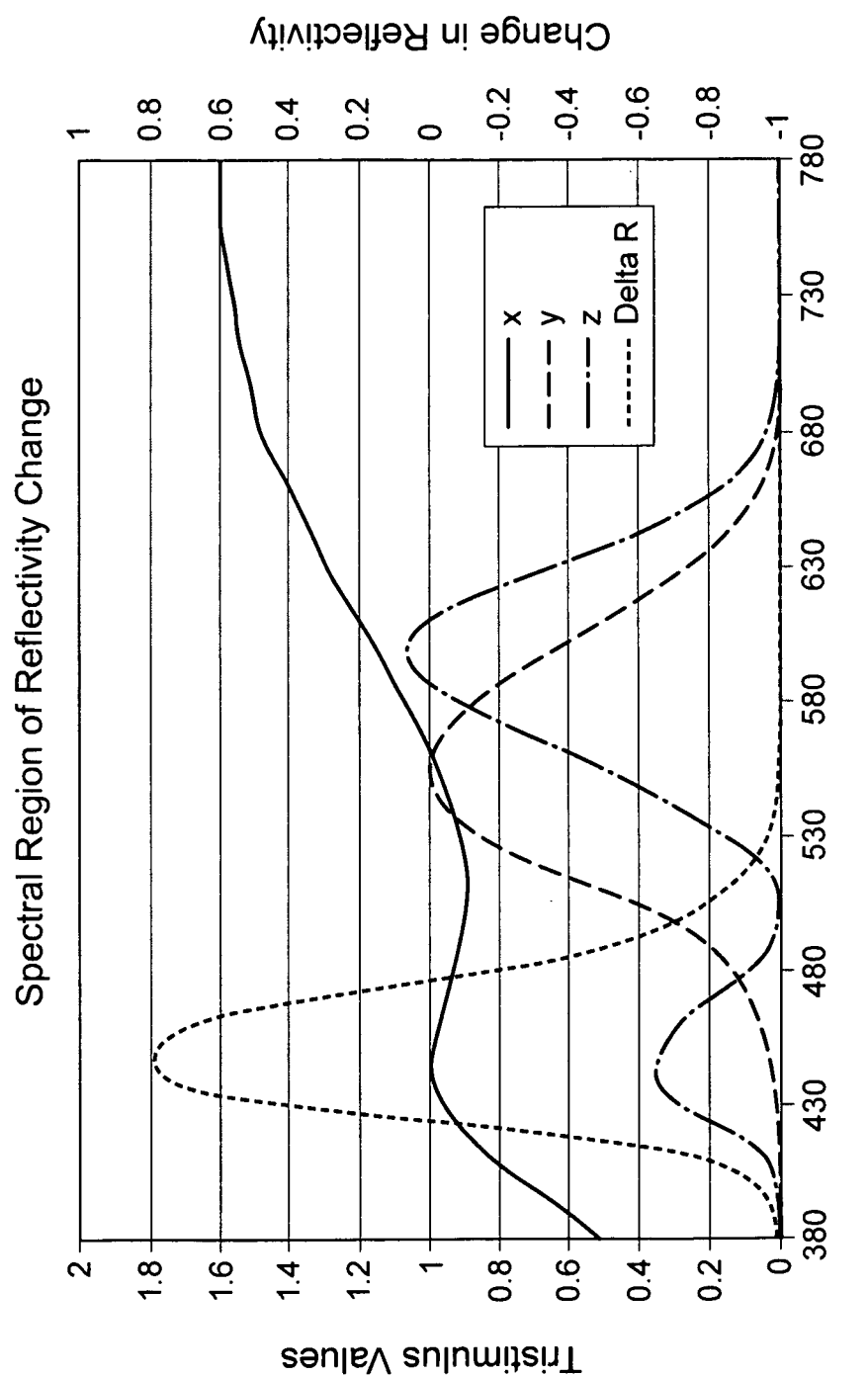
FIG. 5 is a graph showing changes in the reflectivity between the as-deposited and tempered states compared to the tristimulus values used in the color calculations.

FIG. 5 is a graph showing the change in the reflected spectral response (AR=R tempered−R as-coated) between the as-deposited and tempered/heat-treated coating in comparison to the tristimulus values used in the color calculations. The largest changes in the reflectivity occur in regions where the tristimulus values are close to zero. This results in a reduced amount of change in the reflected color between the as-coated and tempered/heat-treated states. This consideration is independent of the source illuminant.

FIG. 6 is a table showing the as-coated visible reflection, visible transmission, and color values at normal incidence (Ill. 2° C.) (with backside reflection).

FIG. 7 is a table showing the resulting optical quantities of the samples in FIG. 6 after exposure to 650 degrees C. for 10 minutes.

FIGS. 6 and 7 can be used to compare the change in the optical quantities indicated between the as-coated and heat-treated/tempered states. The optical quantities shown are for three substantially equally spaced cross-coater positions (P,C,V) across a total width of 96 inches. Of course, the number of coater positions, their locations, and/or the total width may vary in different embodiments of this invention. Upon tempering, there was an increase in the visible transmission, reduction of visible reflection, and a very small ($\Delta E^* < 2$) reflected color shift. The color is considered within the industry standard after exposure to a tempering environment.

FIG. 8 is a table showing additional data regarding the stress in certain example embodiments of a three-layer temperable AR coating. FIG. 8 contains information about a coating made in a similar manner to Example 1, as well as comparative examples, but does not necessarily reflect information from Example 1 itself. The first coating (a) in FIG. 8 is a three-layer AR coating made according to certain example embodiments of this invention, and gives the values and types of the net residual stress in the coating as-deposited, and after heat-treating and/or tempering at 650 degrees C. for 10 minutes. The negative values for $\sigma_x$ and $\sigma_y$ are indicative of the stress being compressive. Positive values, on the other hand, indicate tensile stress. In coatings (a), (b), and (c), it can be seen that the as-deposited net residual stress values are all negative. Therefore, as-deposited, each of these coatings has a net compressive residual stress. However, upon heat-treating and/or tempering, the stress in these coatings moves more toward tensile residual stress. As can be seen from FIG. 8, coating (a)'s titanium oxide-based layer has a thickness of 19 nm. Because the compressive residual stress of the silicon oxide and silicon oxynitride-based layers is higher than the tensile residual stress of the titanium oxide-based layer, the net residual stress of coating (a), even after heat-treatment, is compressive rather than tensile. In certain example embodiments, this net compressive stress will result in a more durable coating (as compared to a coating with a net tensile stress). Comparative coatings (b) and (c) show that when the titanium oxide-based layer is thicker—100 nm in coating (b) and 102 nm in coating (c), after heat-treating, the net residual stress is tensile (demonstrated by the positive $\sigma_x$ and $\sigma_y$ values). The stress values for single layers (i) and (ii) are provided simply to show that the residual stress of both a silicon oxide-based layer and a silicon oxynitride-based layer is compressive both before and after heat treating. These compressive residual stress values each act to offset the tensile residual stress of the titanium oxide-based layer.

From FIG. 8, it will be appreciated that including some layers in the coating that have a compressive residual stress, even after heating, and/or thinning any layers having a tensile residual stress, may advantageously result in a coating having a net compressive residual stress, even after heat-treatment. In certain example embodiments, if a layer prone to tensile stress can be thinned and/or otherwise modified such that the tensile stress is less than the compressive stress of other layers in the stack, the overall net residual stress of the stack/coating may be compressive. Therefore, a temperable three-layered AR coating that maintains durability even after heat-treatment may be produced, in certain example embodiments, by (1) including layer(s) having a compressive residual stress, e.g., low index layers such as silicon oxide and medium index layers such as silicon oxynitride, and/or (2) modifying layers prone to having tensile stress, such as high index titanium oxide-based layer(s), e.g., by reducing their thickness to less than about 25 nm (more preferably less than about 22 nm, and even more preferably approximately equal to or less than 20 nm). The foregoing explanation is by way of example. In other example embodiments, layers having a net compressive stress (even after heating) may be made by other means.

Figures 9, 11:
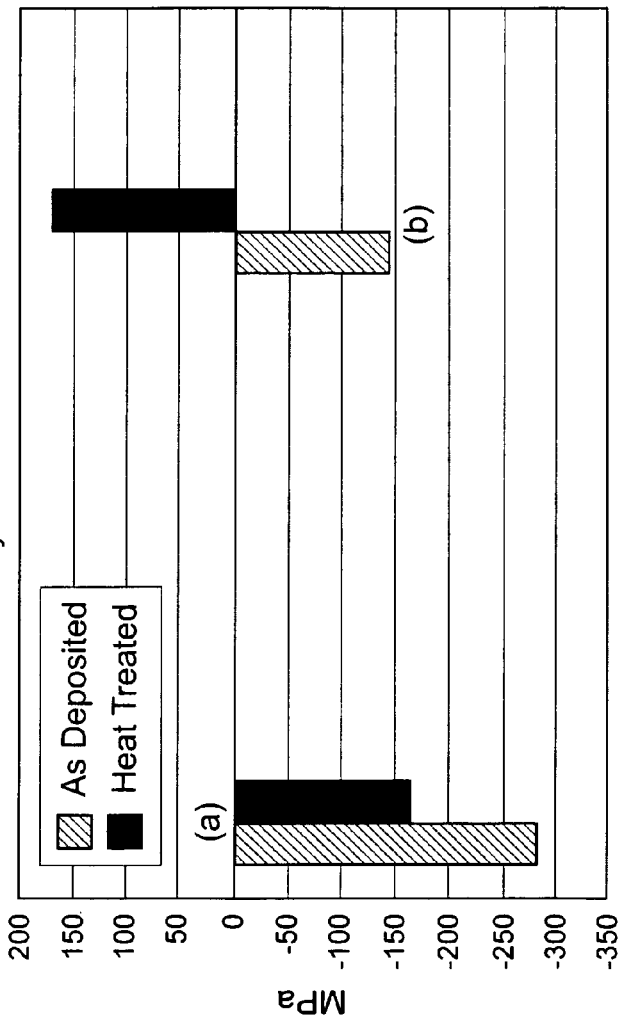
FIG. 9 is a graph showing the residual stress for coatings with various titanium oxide thicknesses.
FIG. 11 is a table showing example optimal thicknesses and refractive indices for AR coatings made according to certain example embodiments of this invention.

FIG. 9 is a graph comparing the as-deposited stress and stress after heating in for coatings (a) and (b) from FIG. 8. FIG. 9 shows that coating (a) has compressive residual stress both before and after heating. FIG. 9 also shows that coating (b) (a comparative example including a titanium oxide-based layer having a thickness of 100 nm) has a net compressive stress prior to heating; however, after heat treating, coating (b) has a net tensile stress. In certain example embodiments, reducing the amount of tensile stress present in an overall coating (such as in coating (a)) can help improve the durability of the coating.

Example 2

A temperable AR coating was applied to both surfaces of a glass substrate (e.g., a double sided coating was made).

The double-sided coating (as shown in FIG. 3) also maintains its optical and aesthetic qualities after tempering/heat-treatment processes, when coated on the Sn side of float glass, without the need for any additional surface preparation such as polishing. The coating design described in the preceding paragraphs with respect to Example 1 can be applied to the second surface (or Sn side) of the glass to reduce the overall reflection from both interferences.

Figure 10:
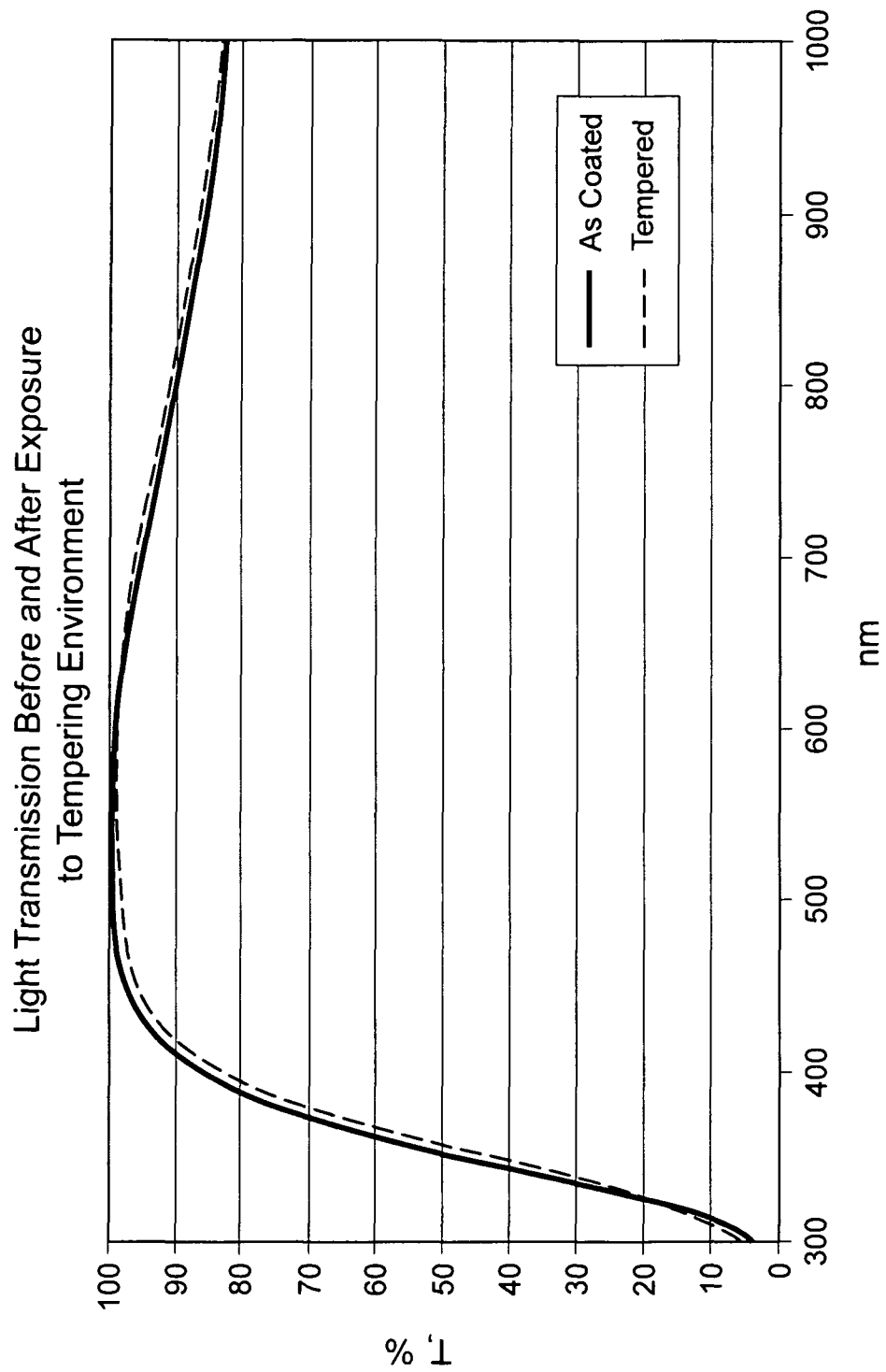
FIG. 10 is a graph comparing the light transmission of a coated article made according to examples described herein, before and after exposure to a tempering environment.

FIG. 10 illustrates the light transmission achieved with the above-described design applied to both surfaces of low iron glass before and after tempering/heat-treating. The photopic light transmission increases after exposure to a tempering environment and exceeds 99% at normal incidence on 3.2 mm low iron glass.

FIG. 11 illustrates example ranges of physical thicknesses and refractive indices for temperable AR coating 3 when SiOxNy, TiOx, and SiOx are used for the medium index, high index, and low index layers, respectively. FIG. 9 represents example thicknesses used for each layer in a preferred embodiment of this invention; however, other physical thicknesses may be used for each of the layers in other instances.

Example ranges for the thicknesses of each layer are as follows:

TABLE 1

(Example Materials/Thicknesses; FIG. 1 Embodiment)

| Layer | Range(nm) | More Preferred(nm) | Example(nm) |
|---|---|---|---|
| SiO$_x$N$_y$ (layer 5) | 75-135 nm | 94-115 nm | 95 nm |
| TiO$_x$ (layer 7) | 10-35 nm | 12-22 nm | 21 nm |
| SiO$_x$ (layer 9) | 70-130 nm | 89-109 nm | 105 nm |

In certain example embodiments, AR coatings described herein may be used on thin, low-iron glass. Example low-iron glass substrates are disclosed in, for example, U.S. application Ser. No. 12/385,318, as well as in U.S. Publication Nos. 2006/0169316; 2006/0249199; 2007/0215205; 2009/0223252; 2010/0122728; and 2009/0217978, the entire contents of each of which are hereby incorporated herein by reference. In certain example embodiments, when Example 2 was applied to 3.2 mm low-iron glass, the visible transmission was measured at about 99%. However, the coated articles described herein may have a visible transmission of at least about 85%, sometimes at least about 90%, sometimes at least about 95%, and still other times even higher (e.g., around 99%), depending on the desired end-application.

The following tables show the as coated to heat treated color shifts for the single sided and double sided AR coatings on low-iron glass. It will be appreciated that the heat treatment processes have a reduced (and sometimes no) appreciable impact on the aesthetic (e.g., reflected color) quality of the coating. The example coatings described herein have purple hues as deposited, for example. The example purple hue is maintained after heat treatment. This is particularly desirable in a number of applications, where aesthetic quality in terms of reflected color is correspondingly desired.

Example Single-Sided AR Average Color Readings

| | L* | a* | b* | Y |
|---|---|---|---|---|
| SS Bake Trans | 97.92 | −0.92 | 0.77 | 94.72 |
| SS Bake Glass | 25.96 | 3.99 | −3.93 | 4.73 |
| SS Bake Film | 25.80 | 3.94 | −3.95 | 4.68 |
| SS Trans | 97.56 | −0.83 | 1.19 | 93.82 |
| SS Glass | 26.34 | 2.75 | −3.46 | 4.86 |
| SS Film | 26.02 | 2.75 | −3.30 | 4.75 |

Example Single-Sided AR Predicted Color Shifts During Bake

| | ΔL* | Δa* | Δb* | ΔY | ΔE |
|---|---|---|---|---|---|
| Transmission | 0.37 | −0.09 | −0.43 | 0.91 | 0.57 |
| Glass | −0.38 | 1.24 | −0.47 | −0.13 | 1.38 |
| Film | −0.22 | 1.20 | −0.65 | −0.07 | 1.38 |

Example Double-Sided AR Average Color Readings

| | L* | a* | b* | Y |
|---|---|---|---|---|
| DS Bake Trans | 99.47 | −1.53 | 1.42 | 98.63 |
| DS Bake Glass | 6.08 | 24.93 | −19.38 | 0.75 |
| DS Bake Film | 6.11 | 24.91 | −19.30 | 0.76 |
| DS Trans | 99.12 | −1.36 | 2.02 | 97.74 |
| DS Glass | 6.36 | 19.13 | −16.87 | 0.79 |
| DS Film | 6.42 | 19.31 | −16.98 | 0.80 |

Example Double-Sided AR Predicted Color Shifts During Bake

| | ΔL* | Δa* | Δb* | ΔY | ΔE |
|---|---|---|---|---|---|
| Transmission | 0.35 | −0.17 | −0.59 | 0.89 | 0.71 |
| Glass | −0.27 | 5.80 | −2.50 | −0.04 | 6.32 |
| Film | −0.31 | 5.60 | −2.32 | −0.04 | 6.07 |

The layers described herein may be stoichiometric and/or substantially fully stoichiometric in certain example embodiments; whereas the layers may be sub-stoichiometric in different example embodiments. However, it will be appreciated any suitable stoichiometry may be used in connection with the any of the example layers described herein.

Furthermore, in some instances, other layer(s) below, within, or above the illustrated coating 3 may also be provided. Thus, while the layer system or coating is "on" or "supported by" substrate 1 (directly or indirectly), other layer(s) may be provided therebetween. Thus, for example, the coating 3 of FIG. 1 and the layers thereof may be considered "on" and "supported by" the substrate 1 even if other layer(s) are provided between layer 5 and substrate 1. Moreover, certain layers of the illustrated coating may be removed in certain embodiments, and other layers added in other embodiments of this invention without departing from the overall spirit of certain embodiments of this invention. In certain other example embodiments, coating 3 may consist essentially of layers 5, 7, and 9, and layer 9 may be exposed to the atmosphere (e.g., layer 9 may be the outermost layer of the coating in certain example embodiments).

The example embodiments described herein may be used in connection with a variety of applications. For instance, a single-sided AR coating made according to the example embodiments described herein may be used for applications such as, for example, lights for commercial or residential areas or at sports or other large venues or arenas, lighting application in general, touch screens, etc. A double-sided AR coating made according to the example embodiments described herein may be used for applications such as, for example, electronics, displays, appliances, facades, etc. Of course, other applications also are possible for the example embodiments disclosed herein.

A coated article as described herein (e.g., see FIGS. 1-3) may or may not be heat-treated (e.g., tempered) in certain example embodiments. Such tempering and/or heat treatment typically requires use of temperature(s) of at least about 580 degrees C., more preferably of at least about 600 degrees C. and still more preferably of at least 620 degrees C. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Some or all of the layers described herein may be disposed, directly or indirectly, on the substrate 1 via sputtering or other suitable film formation technique such as, for example, combustion vapor deposition, combustion deposition, etc.

FURTHER EXAMPLES

As discussed above, certain materials may result in undesirable color shifts, ΔE*, between the pre and post-tempered application of an AR layer. Accordingly, it will be appreciated that there is a need to identify and integrate materials into three-layer anti reflective coatings that maintain (e.g., to the greatest extent possible) the desired optical properties after exposure to typical heat treating (e.g., tempering) environments.

As discussed above with reference to FIG. 1, for example, certain embodiments may incorporate an AR coating 3 with a medium index layer 5, a high index layer 7, and a low index layer 9. The inventors have identified that using materials, such as SiOxNy, in combination with, for example, TiOx and SiOx at certain thicknesses may result in a three-layer anti-reflective coating that better maintains the optical properties between the as deposited state and a heat treated or tempered state.

Figure 12:
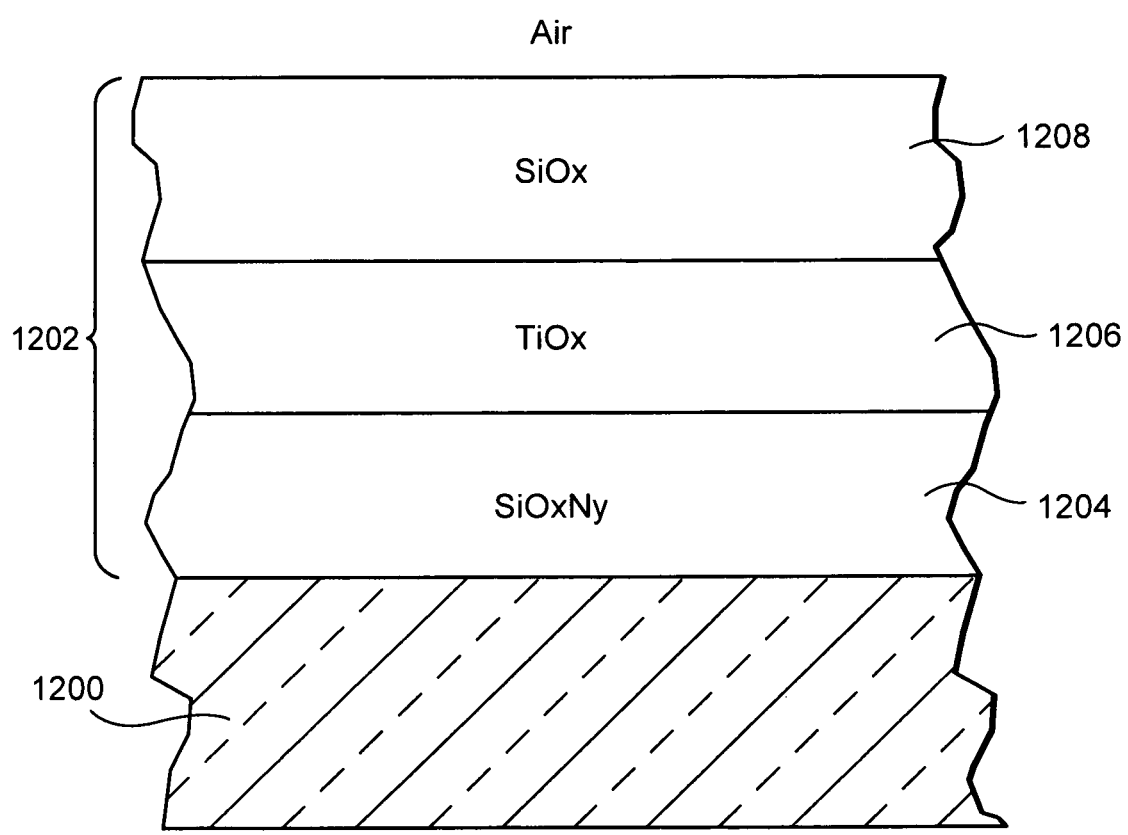
FIG. 12 is an example of a three-layered temperable AR coating made according to certain example embodiments.

FIG. 12 is an example of a three-layered temperable AR coating made according to certain example embodiments. A medium index layer 1204 of or including SiOxNy preferably has a thickness of from about 45 to 85 nm, more preferably from about 50 to 70 nm, even more preferably from about 55 to 65 nm. In certain example embodiments, the thickness of the layer of SiOxNy may be about 60-61 nm.

It has surprisingly been found that silicon oxynitride (e.g., SiOxNy) can be deposited to have an index of refraction of from about 1.60 to 2.0, more preferably from about 1.65 to 1.9, even more preferably from about 1.7 to 1.85 or 1.7 to 1.8, and most preferably from about 1.7 to 1.79 (at 550 nm), and will not significantly degrade in its optical properties upon tempering and/or heat treatment. Moreover, in certain example embodiments, a layer of or comprising silicon oxynitride (e.g., SiOxNy) may produce the following advantages: 1) Small color shift (e.g., ΔE*<3 units), after baking in an air environment at times and temperatures ranges typical for glass tempering processes; 2) Little to no appreciable degradation in the desired optical characteristics of the coating after tempering in the visible region of the spectrum; and 3) Little to no appreciable change in the refractive index in the visible portion of the spectrum after exposure to typically tempering environments. Therefore, the inventors advantageously discovered that a layer of or including silicon oxynitride (e.g., SiOxNy) is suitable for use as a medium index layer 1204 in a temperable three layer AR coating.

In certain example embodiments, the high index layer 1206 is provided over the medium index layer 1204 of the AR coating 1202. The high index layer 1206 has an index of refraction of at least about 2.0, preferably from about 2.1 to 2.7, more preferably from about 2.25 to 2.55, and most preferably from about 2.3 to 2.5 (at 550 nm) in certain example embodiments. In certain example embodiments, a particularly desirable index of refraction of the high index layer 1206 at 380 nm may be from about 2.7 to 2.9 (and all sub-ranges therebetween). In further example embodiments, an ideal index of refraction of the high index layer 1206 at 780 nm may be from about 2.2 to 2.4 (and all sub-ranges therebetween).

The high index layer 1206 preferably has a thickness of from about 75 to 125 nm, more preferably from about 85 to 115 nm, even more preferably from about 95 to 105 nm, and most preferably from about 100 to 105 nm. In certain exemplary embodiments, the high index layer 1206 has a thickness of around 102 nm.

In certain instances, it is advantageous that the material(s) comprising the high index layer 1206 have a high index of refraction. An example material for use as a high index layer is titanium oxide (e.g., TiOx). The titanium oxide may be stoichiometric $TiO_2$ or partially oxygen deficient/sub-stoichiometric TiOx in different embodiments of this invention. Of course, other materials (including those of or including TiOx) may be used in different embodiments of this invention.

In certain example embodiments, the low index layer 1208 is provided over the high index layer 1206 of the AR coating 1202. The low index layer 1208 has an index of refraction of from about 1.4 to 1.6, more preferably from about 1.45 to 1.55, and most preferably from about 1.48 to 1.52 (at 550 nm) in certain example embodiments. In certain example embodiments, an ideal index of refraction of the low index layer 1208 at 380 nm may be from about 1.48 to 1.52 (and all sub-ranges therebetween). In further example embodiments, an ideal index of refraction of the low index layer 1208 at 780 nm may be from about 1.46 to 1.5 (and all sub-ranges therebetween).

In certain example embodiments, the low index layer 1208 has a thickness of from about 70 to 130 nm, more preferably from about 80 to 115 nm, even more preferably from about 85 to 105 nm, and most preferably from about 85 to 95 nm. In certain example embodiments, the thickness of the low index layer may be 87-93 nm.

In certain instances, it is advantageous that the material(s) comprising the low index layer 1208 have an index of refraction lower than both the medium and high index layers, and in certain example embodiments, the refractive index of the low index layer 1208 may be less than that of the glass substrate upon which the coating is provided. An example material for use as a low index layer is silicon oxide (e.g., SiOx). Of course, other materials (including those of or including SiOx) may be used in different embodiments of this invention. For instance, the layer may be a silicon-inclusive layer that is partially oxided and/or nitrided in different embodiments of this invention.

Figure 13:
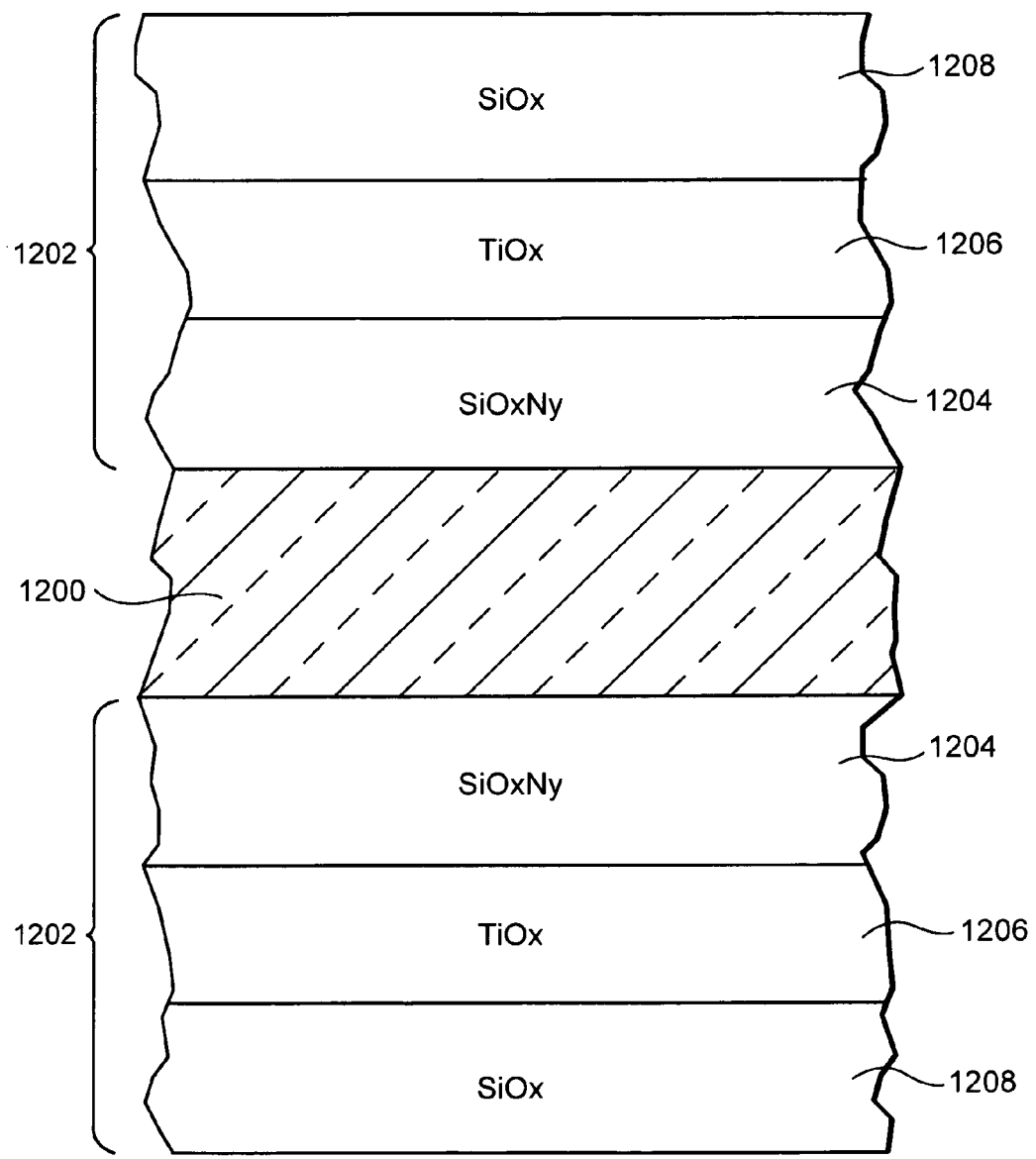
FIG. 13 is an example of a two-sided temperable AR coating made according to certain example embodiments.

The AR coating 1202 of FIG. 12 may be provided on only one major surface of glass substrate 1200 as shown in FIG. 12. However, FIG. 13 illustrates an example embodiment where the AR coating 1202 is provided on both major surfaces of the glass substrate 1200. In other words, a first AR coating 1202 is provided on a first major surface of the substrate 1200 and a second AR coating 1202 is provided on a second major surface of the substrate 1200.

Example Anti-Reflective Coating Applied to a Single Glass Surface

Figure 14:
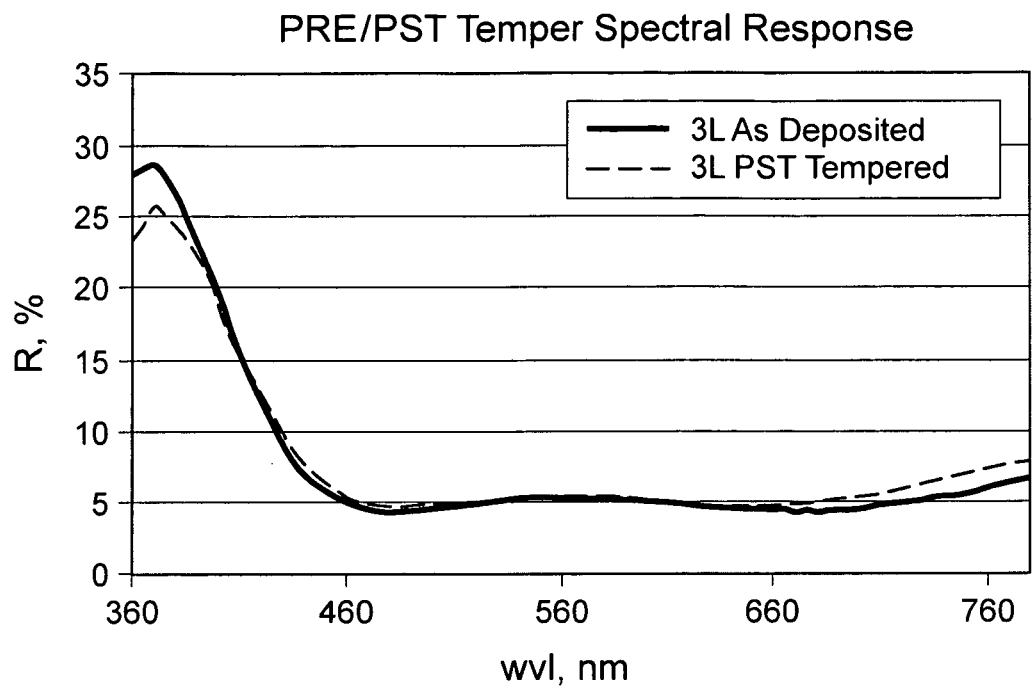
FIG. 14 is a graph showing the surface reflectivity comparison of a three-layer AR coating before and after exposure to a tempering environment according to certain example embodiments.

FIG. 14 is a graph showing the surface reflectivity comparison of a three-layer AR coating before and after exposure to a tempering environment according to certain example embodiments. For example, an AR coating may be include the following layers in order moving away from the substrate: a medium index layer of $SiO_xN_y$ that is about 60 nm thick, a high index layer of $TiO_2$ that is about 102 nm thick, and a lower index layer of $SiO_2$ layer that is about 93 nm thick. The AR coating may be applied to a clear glass substrate of soda lime silica type glass, and the above layers disposed onto the glass substrate, e.g., by sputtering or other suitable technique. In this example, the AR coating is provided on only one major surface of the glass substrate (e.g., as shown in FIG. 12). The coating may then be tempered at a max temperature of 650 degrees C. Of course, as noted above, the same or similar coating may be disposed on the opposing major surface of the soda lime glass substrate.

Figure 15:
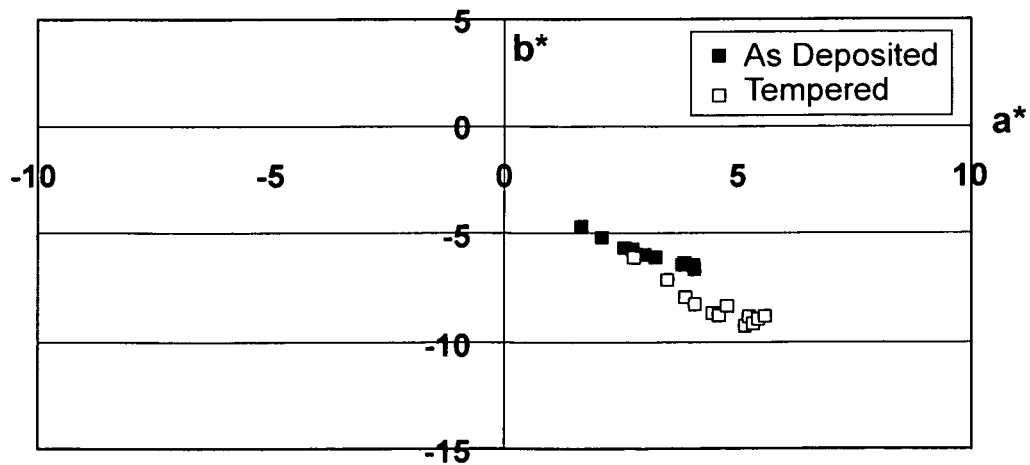
FIG. 15 is a graph showing the color shift before and after tempering using SiOxNy as the middle index layer adjacent to the glass substrate according to certain example embodiments.

As can be seen in FIG. 14, the change in reflectivity response (e.g., % R) between when the three-layer AR is deposited versus after the three-layer AR is tempered may be extremely small. As noted above, it is desirable to have a low difference in optical characteristics between pre- and post-tempering. In certain example embodiments, the change in reflectivity for a single-sided coating made according to certain example embodiments of the invention preferably is less than 1% point, more preferably less than 0.5% points, and still more preferably less than about 0.2-0.3% points FIG. 15 is a graph showing 10 samples of the color shift before and 10 samples after tempering. The data in the FIG. 15 graph is based on 10 samples of the above-described example single-sided AR coating (SiOxNy, TiOx, and SiOx). The measurements were taken with an Illuminate C observer at 2°. The table below summarizes the results of the two above graphs by averaging the 10 measurements. Data from both Illuminate C and D65 observers at 2 and 10 degrees are provided in the table below.

|  | $R_{vis}$ | $T_{vis}$ | $\Delta E^*$ | $R_{vis}$ | $T_{vis}$ | $\Delta E^*$ |
| --- | --- | --- | --- | --- | --- | --- |
| As Deposited | 4.93 | 93.3 | 2.78 | 4.95 | 93.3 | 2.48 |
| Tempered | 4.75 | 93.5 |  | 4.79 | 93.5 |  |
| Illuminant |  | C/2° |  |  | D65/10° |  |

As noted above, it is desirable to achieve a color shift, $\Delta E^*$, between as deposited and tempered of less than 3. As can be seen in the above table, when using illuminate C at 2° and illuminate D65 at 10° the $\Delta E^*$ value for the above example 3 layer AR is below the desired $\Delta E^*$ value of 3. Furthermore, both the $R_{vis}$ and $T_{vis}$ optical properties are substantially the same or similar pre- and post tempering. Such attributes are desirable in producing tempered coated articles.

Example Anti-Reflective Coating Applied to Both Glass Surfaces

Certain example embodiments may include the following layers in order moving away from the substrate: a medium index layer of $SiO_xN_y$ that is about 61 nm thick, a high index layer of $TiO_2$ that is about 102 nm thick, and a lower index layer of $SiO_2$ layer that is about 87 nm thick. This example three-layer AR coating may be applied to a clear glass substrate of soda lime silica type glass and the above layers disposed onto both sides of the glass substrate, e.g., by sputtering or other suitable technique. In contrast to the above example (e.g., FIG. 12), this example AR coating may be provided on both major surfaces of the glass substrate (e.g., as shown in FIG. 13). The three-layer AR coating may then be tempered at a max temperature of 650 degrees Celsius.

Figure 16:
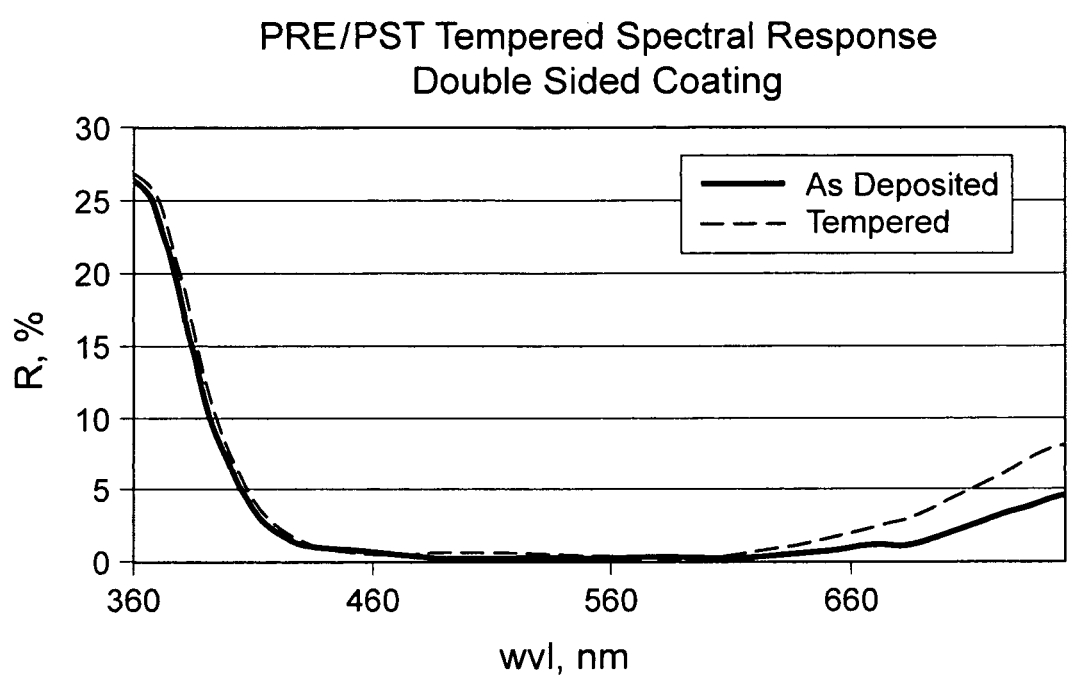
FIG. 16 is a graph showing the surface reflectivity comparison of a three-layer AR coating applied to both surfaces of a glass substrate before and after exposure to a tempering environment according to certain example embodiments.

FIG. 16 is a graph showing the surface reflectivity comparison of the above described three-layer AR coating applied to both surfaces of a glass substrate before and after exposure to a tempering environment according to certain example embodiments. As can be seen, the double sided coating approach may result in a reflectivity percentage of near zero in some case and may further be below 1 from approximately 460 nm to 660 nm. Further, the "as deposited" reflectively response substantially mimics the tempered reflectivity response. As noted above, it is desirable to have the pre- and post-tempering optical characteristics remain substantially similar. In certain example embodiments, the change in reflectivity for a double-sided coating made according to certain example embodiments of the invention preferably is less than 1% point, more preferably less than 0.5% points, and still more preferably less than about 0.2-0.3% points The following table summarizes the optical characteristics pre- and post tempering of the above example three-layer AR coating that may be applied to both sides of a glass substrate.

|  | Rvis | Tvis | $\Delta E^*$ | Rvis | Tvis | $\Delta E^*$ |
| --- | --- | --- | --- | --- | --- | --- |
| As Deposited | 0.35 | 97.7 | 1.42 | 0.36 | 97.9 | 1.44 |
| Tempered | 0.48 | 96.9 |  | 0.52 | 97.2 |  |
| Illuminant |  | C/2° |  |  | D65/10° |  |

As can been seen coating both sides of glass substrate may result in small variances in optical characteristics. Specifically, the above observed $\Delta E^*$ of less than 1.5 quite low. Thus, in certain example embodiments that include a double-sided AR coating, certain example embodiments may achieve a $\Delta E^*$ of less than 3, more preferably less than 2.5, still more preferably less than 2, and sometimes even lower.

Accordingly, the example three-layer AR coating that incorporates SiOxNy at the medium with, for example, TiOx and SiOx at the above described thicknesses may result in a reduction in $R_{vis}$ and a very low (and sometimes even substantially no) reflectively color shift.

Changes in optical characteristics (e.g., $\Delta R_{vis}$, $\Delta T_{vis}$, $\Delta E^*$) between the as deposited and tempered states may be further reduced by adjusting the stoichiometry of the SiOxNy in certain example instances. Alternatively, or in addition, optical characteristics (e.g., $\Delta R_{vis}$, $\Delta T_{vis}$, $\Delta E^*$) between the as deposited and tempered states may be further reduced by adjusting the physical thickness of all the layers in the stack (e.g., the medium, high, and low) in order to shift the spectral curve while maintaining the desired spectral bandpass.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A coated article comprising an antireflective coating supported by a first major surface of a substrate, wherein the antireflective coating comprises, in order moving away from the substrate:
    a silicon-inclusive medium index layer disposed, directly or indirectly, on the first major surface of the substrate, wherein the medium index layer is substantially free of aluminum oxynitride;
    a high index layer disposed over and contacting the medium index layer, the high index layer having a thickness of at least 85 nm;
    a low index layer disposed over and contacting the high index layer;
    wherein the coated article is heat treatable so as to have a $\Delta E^*$ value of less than 3;
    wherein the medium index layer comprises silicon oxynitride and has a index of refraction of from about 1.65 to 2.0 at 380 nm, 550 nm, and 780 nm wavelengths, the high index layer has an index of refraction of at least about 2.0 at 380 nm, 550 nm, and 780 nm wavelengths, the high index layer having a thickness between about 85 nm and 115 nm, and the low index layer has an index of refraction of from about 1.4 to 1.6 at 380 nm, 550 nm, and 780 nm wavelengths.

2. The coated article of claim 1, wherein the medium index layer comprising silicon oxynitride and has an index of refraction of from about 1.7 to 1.8 at 550 nm.

3. The coated article of claim 1, wherein the high index layer comprises an oxide of titanium, and has a thickness between about 95 to 105 nm.

4. The coated article of claim 1, wherein a second major surface of the substrate supports a second antireflective coating that comprises, in order moving away from the substrate:
    a second silicon-inclusive medium index layer, directly or indirectly, on the second major surface of the substrate;
    a second high index layer over and contacting the second medium index layer, the high index layer having a thickness of at least 85 nm; and
    a second low index layer over and contacting the second high index layer,
    wherein all said layers are disposed on the substrate prior to any heat treating.

5. The coated article of claim 4, wherein the coated article is heat treated together with the layers disposed thereon.

6. The coated article of claim 5, wherein the coated article has a $\Delta E^*$ value of less than 2 between as deposited and heat treated states.

* * * * *